United States Patent [19]

Takata et al.

[11] Patent Number: 5,289,895

[45] Date of Patent: Mar. 1, 1994

[54] CONTROL SYSTEM FOR VEHICLE WITH DIFFERENTIAL RESTRICTING DEVICE

[75] Inventors: Minoru Takata; Hideshi Hiruta; Nobuyuki Nakamura, all of Hiroshima; Masaru Shiraishi, Hatsukaichi; Yoshitaka Kimura; Naotsugu Masuda, both of Hiroshima, all of Japan

[73] Assignee: Mazda Motor Corporation, Hiroshima, Japan

[21] Appl. No.: 904,007

[22] Filed: Jun. 24, 1992

[30] Foreign Application Priority Data

Jun. 27, 1991 [JP] Japan .................................. 3-156957
Jun. 27, 1991 [JP] Japan .................................. 3-156961
Jul. 31, 1991 [JP] Japan .................................. 3-213033

[51] Int. Cl.$^5$ ............................................ B60K 17/348
[52] U.S. Cl. .................................... 180/248; 180/249; 364/424.1; 74/866
[58] Field of Search ............................. 180/248, 249; 364/424.1; 74/866

[56] References Cited

U.S. PATENT DOCUMENTS

| | | | |
|---|---|---|---|
| 4,751,856 | 6/1988 | Nakamura et al. | 180/249 X |
| 4,754,835 | 7/1988 | Stelter et al. | 180/248 |
| 4,937,750 | 6/1990 | Gilliam | 180/248 X |
| 5,010,974 | 4/1991 | Matsuda | 180/248 X |
| 5,125,490 | 6/1992 | Suzumura et al. | 180/249 X |
| 5,152,362 | 10/1992 | Naito | 180/248 |

FOREIGN PATENT DOCUMENTS 61-174340 10/1986 Japan .
62-166114 7/1987 Japan .
62-261538 11/1987 Japan .
63-57332 3/1988 Japan .

Primary Examiner—Margaret A. Focarino
Assistant Examiner—C. Mattix
Attorney, Agent, or Firm—Keck, Mahin & Cate

[57] ABSTRACT

A control system for a four-wheel drive vehicle includes a center differential provided between a front shaft and a rear shaft. The control system also includes a device for restricting a differential between the front shaft and the rear shaft by operating the center differential to be in a locking condition and a controller for controlling the differential restricting device so that a differential restricting force is increased based on an increase in an engine output. The differential restricting force is decreased based on an increase in a vehicle body speed.

12 Claims, 18 Drawing Sheets

MAP 1

MAP 2

MAP 4

MAP 5

MAP 6

BASIC MAP

CONTROL SYSTEM FOR VEHICLE WITH DIFFERENTIAL RESTRICTING DEVICE

BACKGROUND OF THE INVENTION

1. Field of the Invention

The present invention relates to a control system for a vehicle with a differential restricting device in particular, to a control system for a vehicle such as a four-wheel drive vehicle having differential restricting devices.

2. Description of the Related Art

A four-wheel drive vehicle is in general provided with a center differential mounted between a front propeller shaft and a rear propeller shaft for compensating the differential between the front wheels and the rear wheels, and a rear differential mounted between right and left rear wheels.

For example, Japanese Patent Laid-Open No. 62-166,114 discloses a four-wheel drive vehcle which comprises a front differential, a center differential, and a rear differential each of the differentials including a differential restricting device such as a clutch. The differential restricting device can be operated to be in locking condition or unlocking condition based on the various traveling conditions of the vehicle such as traveling on rough road, traveling in a straight line, an accelerating condition and a braking condition. The traveling conditions are determined by data representative of wheel rotating speeds and steering angles. The stability, braking performance, acceleration performance and the like of the vehicle can be improved by the such operations.

Japanese Patent Laid-Open No. 62-261,538 discloses a four-wheel drive vehcle with a center differential restricting device which is operated so as to restrict a differential between the front wheels and the rear wheels based on an increase in the differential rotating number between the front wheels and the rear wheels. As a result, a good starting performance can be obtained when the vehicle is trying to get out of rough road.

Japanese Patent Laid-Open No. 63-57,332 discloses a four-wheel drive vehcle with a center differential restricting device which is operated based on the throttle valve opening and the vehicle speed so that tire abrasion and excessive fuel comsumption can be prevented when the vehicle is traveling at a high speed.

Japanese Utility Model Laid-Open No. 61-17,4340 also discloses a four-wheel drive vehcle with a center differential restricting device which is operated based on the throttle valve opening (the engine output).

In the above mentioned conventional four-wheel drive vehicle, the control operation of the differential restricting device based on the differential rotating number between the front wheels and the rear wheels means that the operation is carried out based on the slips which actually occur. On the other hand, the control operation of the device based on the throttle valve opening means that the control operation is carried out in order to prevent the slips before they actually occur.

However, since the actual slips occur differently in respective driving conditions, the above conventional four-wheel drive vehicle can not obtain a good performace in any driving conditions.

SUMMARY OF THE INVENTION

It is therefore an object of the present invention to provide a control system for a four-wheel drive vehicle with good controllability and stability.

It is another object of the present invention to provide a control system for a four-wheel drive vehicle in which electric power consumption can be decreased.

It is further another object of the present invention to provide a control system for a four-wheel drive vehicle which improves fuel consumption efficiency.

It is another object of the present invention to provide a control system for a vehicle with a differential restricting device which has good controllability and stability.

According to the present invention, there is provided a control system for a four-wheel drive vehicle including a center differential provided between a front shaft and a rear shaft. The system includes, means for restricting a differential between the front shaft and the rear shaft by operating the center differential to be in locking condition and means for controlling the differential restricting means so that a differential restricting force is increased based on an increase in an engine output and decreased based on an increase in a vehicle body speed.

In a preferred embodiment of the invention, the controlling means controls said differential restricting means so that a differential restricting force is increased based on an increase in an engine output when the vehicle is stopped and started so that the differential restricting force is decreased based on an increase in a vehicle body speed when the vehicle is traveling.

In another preferred embodiment of the invention, the differential restricting means includes an electro-magnetic clutch which is able to change the differential restricting force based on an amount of electric current supplied thereto. The differential restricting force of the electro-magnetic clutch is zero when a throttle valve opening is zero and increased based on an increase in the throttle valve opening.

In a further preferred embodiment of the invention, the controlling means controls a restricting force of the differential restricting means based on a differential rotating number of the center differential when the vehicle body speed is greater than a predetermined value. The controlling means also controls a restricting force of the differential restricting means based on the engine output when the vehicle body speed is equal to or less than the predetermined value.

The above and other objects and features of the present invention will be apparent from the following description by taking reference to accompanying drawings employed for preferred embodiments of the present invention.

DESCRIPTION OF THE PREFERRED EMBODIMENTS

Figure 1:
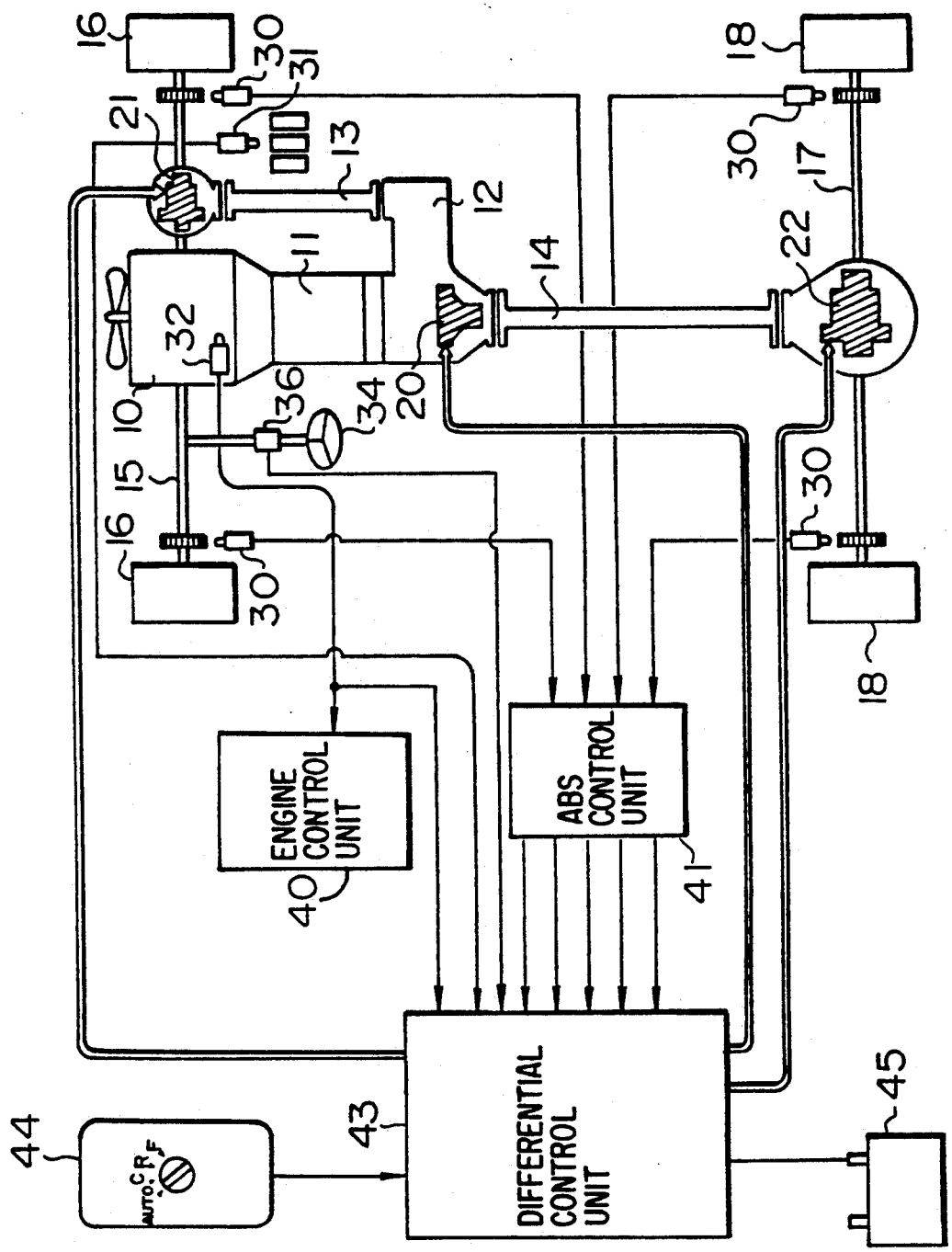
FIG. 1 is an overall schematic view of a four-wheel drive vehicle to which the present invention is applicable.

FIG. 1 is an overall schematic view of a four-wheel drive vehicle to which the present invention is applicable.

Referring to FIG. 1, a power train of the vehicle will be explained first. Reference numeral 10 indicates an engine to which a transmission 11 is connected. To the transmission 11 is connected a transfer 12 to which a front propeller shaft 13, transmitting the engine power to front wheels, and a rear propeller shaft 14, transmitting the engine power to rear wheels, are connected, respectively. The front wheels 16 are connected to the front propeller shaft 13 through a front axle 15, and the rear wheels 18 are connected to the rear propeller shaft 14 through a rear axle 17. The transfer 12 is provided with a center differential 20, the front axle 15 is provided with a front differential 21, and the rear axle 17 is provided with a rear differential 22.

Wheel speed sensors 30 are attached respectively to the front wheels 16 and the rear wheels 18 in order to detect the respective wheel speeds of the wheels 16, 18. Reference numeral 31 indicates a brake switch for detecting on-off operation of a brake. Reference numeral 32 indicates a throttle sensor for detecting a throttle valve opening of the engine 10. Reference numeral 34 indicates a steering wheel, which is provided with a steering angle sensor 36 for detecting a steering angle of the steering wheel 34.

Reference numeral 40 indicates an engine control unit to which the throttle valve opening detected by the throttle sensor 32 is input. Reference numeral 41 indicates a control unit for an antiskid braking system (hereinafer called ABS control unit) to which the respective wheel speeds detected by the wheel speed sensors 30 are input. Reference numeral 43 indicates a differential control unit to which a manual switch 44 described hereinbelow in detail and a battery 45 are connected respectively. To the differential control unit 43 are input the throttle valve opening detected by the throttle sensor 32, a brake signal representative of the on-off operation of the brake detected by the brake switch 31, the respective wheel speeds detected by the wheel speed sensors 30, and a mode signal output from the manual switch 44. Based on this input information, the differential control unit 43 applies electric current to the center differential 20, the front differential 21, and the rear differential 22 respectively so as to operate the differentials 20, 21, 22 in unlocking condition, half-locking condition, and complete locking condition basen on the amount of the supplied electric current.

Figure 2:
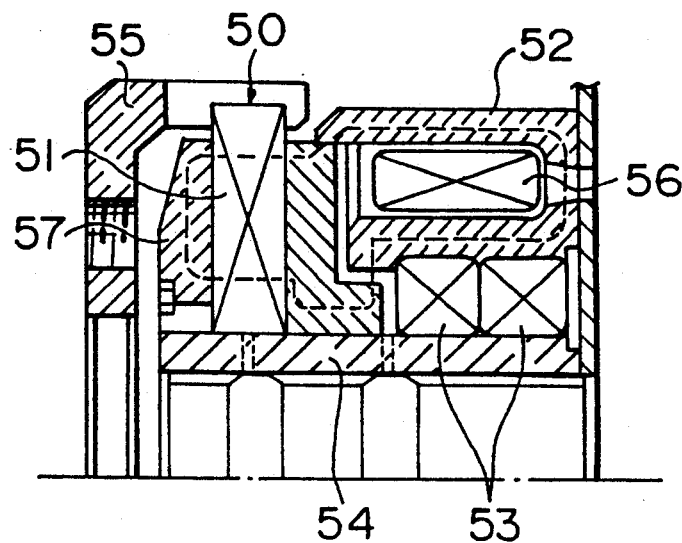
FIG. 2 is a cross-sectional view of an electro-magnetic multiplate clutch provided in the center differential.

FIG. 2 is a cross-sectional view of an electro-magnetic multiplate clutch provided in the center differential. The center differential 20 is provided with an electro-magnetic multiplate clutch 50 by which the center differential 20 is operated in the unlocking condition, half-locking condition, and complete locking condition. Instead of the electro-magnetic multiplate clutch 50 shown in FIG. 2, the invention may employ any type of clutch which can restrict a differential between the front propeller shaft 13 and the rear propeller shaft 14.

In FIG. 2, the electro-magnetic multiplate clutch 50 is provided with a clutch plate 51, including a plurality of inner disks and outer disks, and an actuator 52 for operating the clutch plate 51.

The electro-magnetic multiplate clutch 50 is further provided with a bearing 53, a member 54 for transmitting the power to one propeller shaft, and a member 55 for transmitting the power to the other propeller shaft. The actuator 52 includes a solenoid 56 and an armature 57 which pushes out the clutch plate 51 by the magnetic force generated when the electric current is supplied to the solenoid 56. Since the amount of the electric current supplied to the solenoid 56 is proportional to the torque generated in the electro-magnetic multiplate clutch 50, namely, the pushing force on the clutch plate 51, a differential rotation number of the center differential 20 can be controlled based on the amount of the electric current so as to change continuously.

The front differential 21 and the rear differential 22 have the same type of electro-magnetic multiplate clutch as that shown in FIG. 2.

Referring to Table 1, control operations carried out by the mode selected in the manual switch 44 will be described below.

TABLE 1

| MANUAL SWITCH | DIFFERENTIAL | CONTROL OPERATION (ELECTRIC CURRENT) |
|---|---|---|
| AUTO (A mode) | front | unlocking condition (If = 0) |
|  | center | auto mode control operation |
|  | rear | auto mode control operation |
| C (C mode) | front | unlocking condition (If = 0) |
|  | center | complete locking condition (Ic = 2.2A) |
|  | rear | auto mode control operation |
| R (R mode) | front | unlocking condition (If = 0) |
|  | center | complete locking condition (Ic = 2.2A) |
|  | rear | complete locking condition (Ir = 4.1A) |
| F (F mode) | front | complete locking condition (Ir = 2.1A) |
|  | center | complete locking condition (Ic = 2.2A) |
|  | rear | complete locking condition (IR = 4.1A) |

When AUTO (A mode) is selected in the manual switch 44, the front differential 21 is operated to be in unlocking condition and the center differential 20 and the rear differential 22 are respectively controlled to be in auto mode control operation which is explained below. When C (C mode) is selected in the manual switch 44, the front differential 21 is operated to be in unlocking condition, the center differential 20 is operated to be in complete locking condition, and the rear differential 22 is controlled to be in auto mode control operation. When R (R mode) is selected in the manual switch 44, the front differential 21 is operated to be in unlocking condition, the center differential 20 and the rear differential 22 are respectively operated to be in complete locking condition. When F (F mode) is selected in the manual switch 44, all of the front differential 21, the center differential 20 and the rear differential 22 are operated to be in complete locking condition. Here, If indicates electric current supplied to the front differential 21, Ic indicates electric current supplied to the center differential 20, and Ir indicates electric current supplied to the rear differential 22. Respective numerals such as 2.2A, 4.1A in If, Ic and Ir indicate the amounts of the electric current supplied to the electol-magnetic multiplate clutches provided in respective differentials. When such amounts of the electric current are supplied, respectively, the differentials are operated to be in complete locking condition.

The A mode, C mode, R mode and F mode are selected manually by a driver of the vehicle. Since the front differential 21 is operated to be in unlocking condition in A mode, the vehicle has a normal driving force and a high controllability. Therfore, A mode is suitable for normal on-road traveling. On the other hand, since the front differential 21, center differential 20 and rear differential 22 are operated to be in complete locking condition in F mode, the vehicle has a large driving force despite low controllability. Therefore, F mode is suitable for an off-road traveling. C mode and R mode are located between A mode and F mode and, therefore, can be selected by the driver in his favor.

A first embodiment of the present invention will be described hereinafter with reference to FIGS. 3 through 9.

Referring to FIGS. 3 through 9, there are shown the flow charts which represent how the differentials are controlled by the control unit 43. Symbol P indicates each step in the flow charts.

Figure 3:
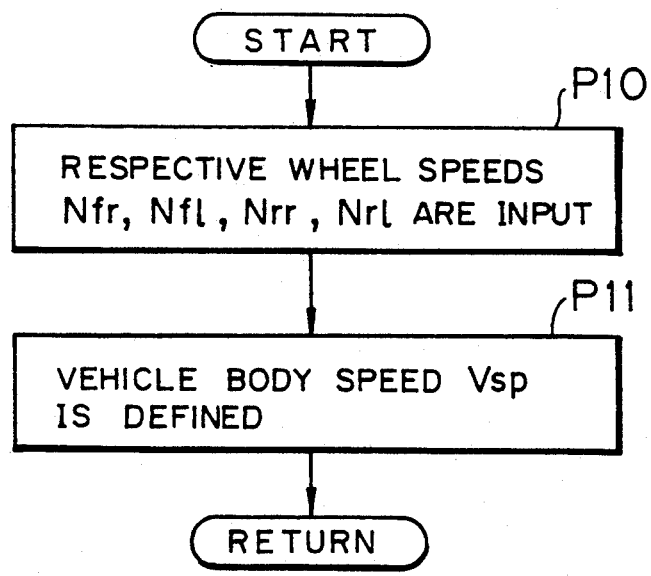
FIG. 3 is a flow chart for defining a vehicle body speed Vsp in auto mode control operation.

FIG. 3 is a flow chart for defining a vehicle body speed Vsp in auto mode control operation employed in A mode and C mode. In FIG. 3, respective wheel speeds Nfr, Nfl, Nrr, Nrl are input to the control unit 43 (P 10). Nfr indicates a wheel speed of the right front wheel, Nfl indicates a wheel speed of the left front wheel, Nrr indicates a wheel speed of the right rear wheel, and Nrl indicates a wheel speed of the left rear wheel. Next, the smallest value among the wheel speeds Nfr, Nfl, Nrr, Nrl is defined as a vehicle body speed Vsp (P 11).

Figure 4:
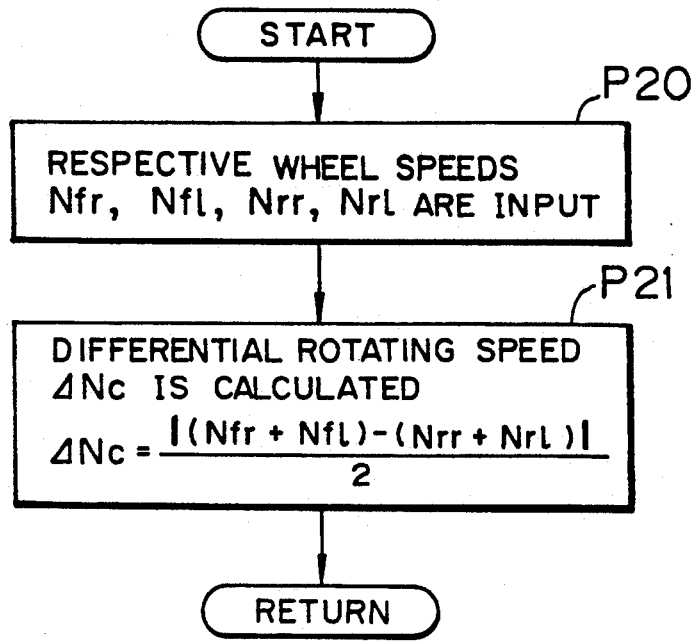
FIG. 4 is a flow chart for obtaining a differential rotating speed in the center differential in auto mode control operation.

FIG. 4 is a flow chart for obtaining a differential rotating speed in the center differential in the auto mode control operation. In FIG. 4, respective wheel speeds Nfr, Nfl, Nrr, Nrl are input to the control unit 43 (P 20). Next, the differential rotating speed in the center differential $\Delta Nc$ is calculated by the equation (P 21).

Figure 5:
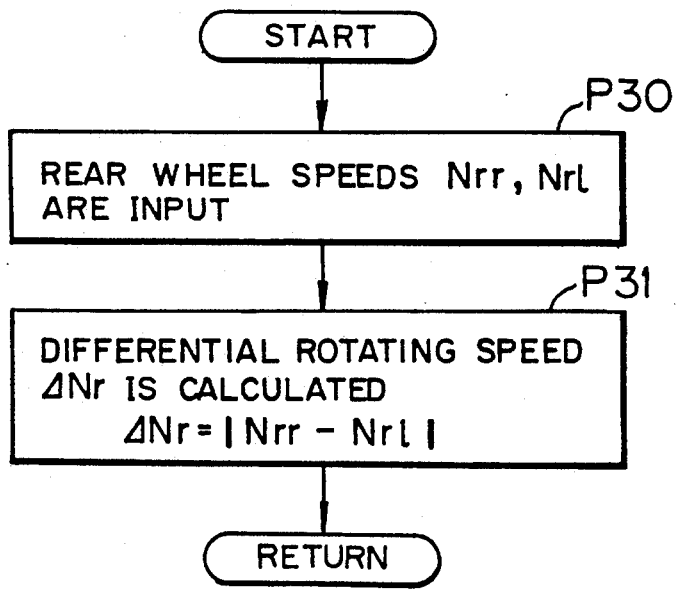
FIG. 5 is a flow chart for obtaining a differential rotating speed in the rear differential in auto mode control operation.

FIG. 5 is a flow chart for obtaining a differential rotating speed in the rear differential in auto mode control operation. In FIG. 5, respective wheel speeds Nrr, Nrl of the rear wheels are input to the control unit 43 (P 30). Next, the differential rotating speed in the rear differential $\Delta Nr$ is calculated by the equation (P 31).

A first embodiment of the present invention will be described hereinbelow with reference to FIGS. 6 through 9.

Figure 6:
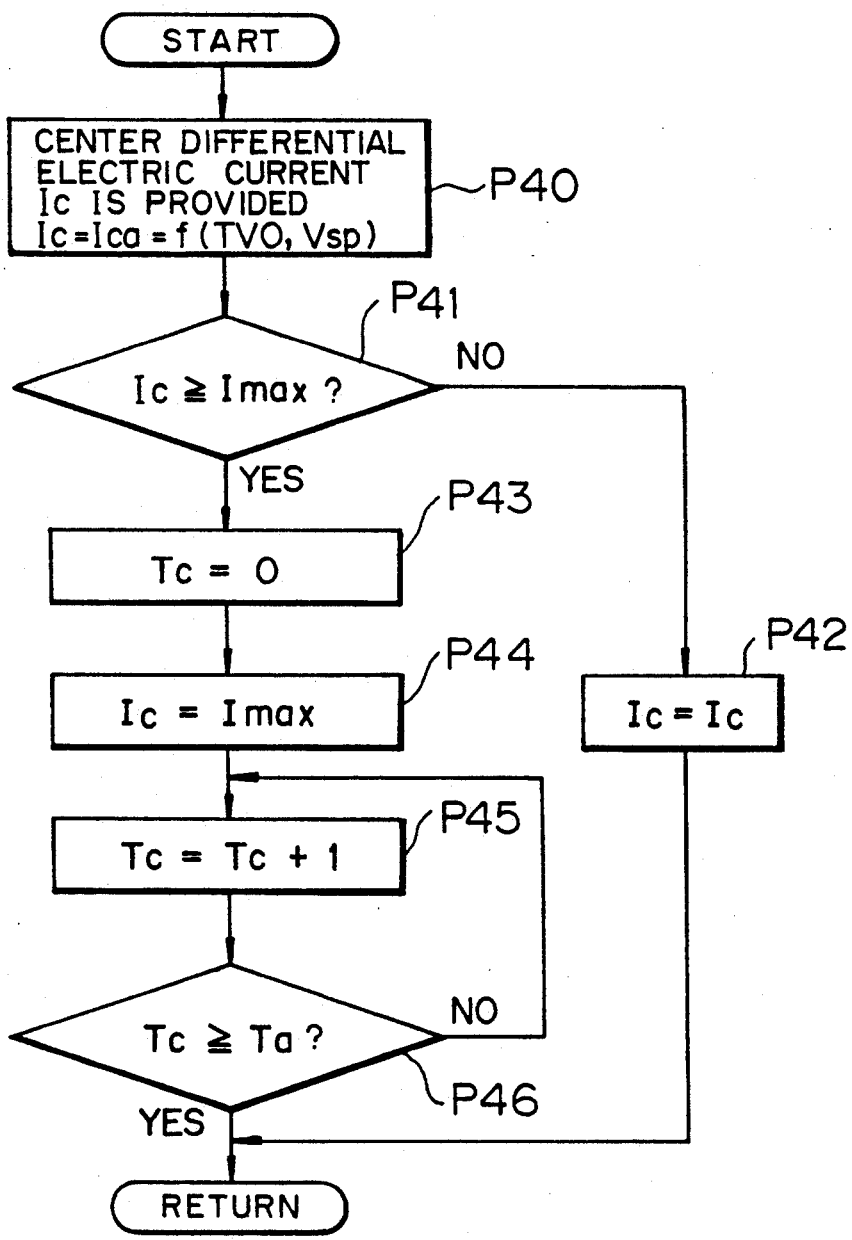
FIG. 6 is a flow chart for determining an amount of the center differential electric current Ic in auto mode control operation according to a first embodiment of the present invention.
Figure 7:
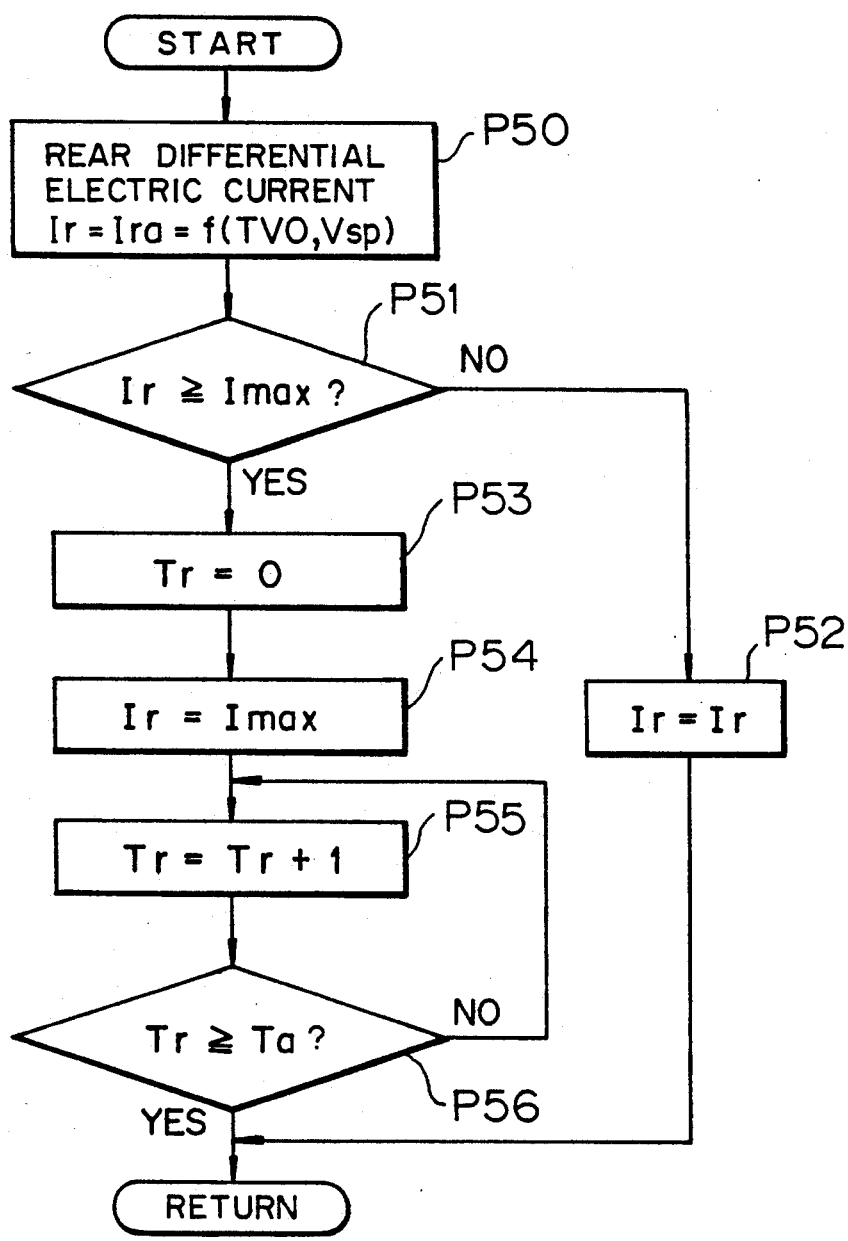
FIG. 7 is a flow chart for determining an amount of the rear differential electric current Ir in auto mode control operation according to the first embodiment of the present invention.
Figure 8:
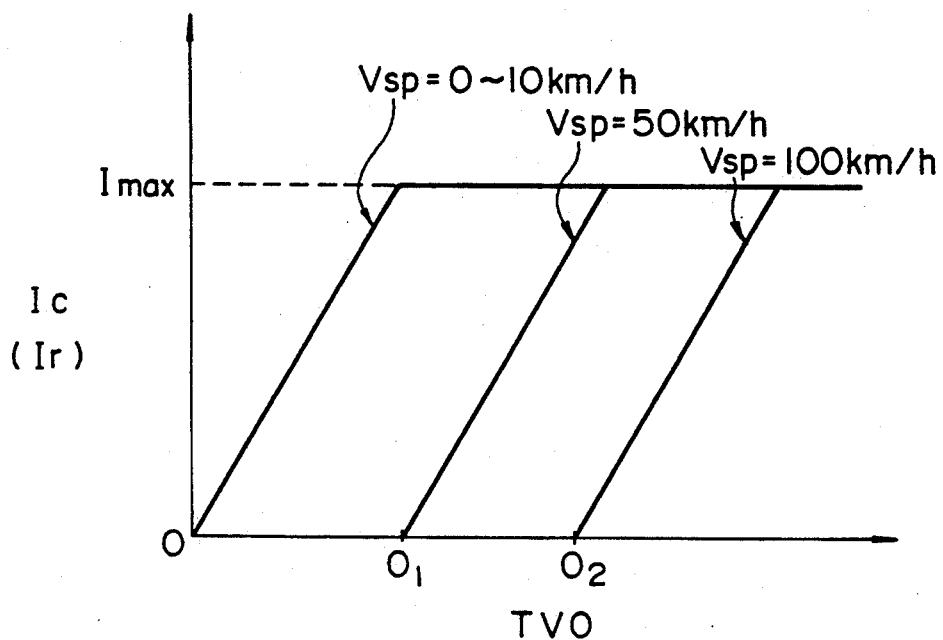
FIG. 8 indicates a map showing a relationship between the center differential electric current Ic (or the rear differential electric current Ir) and the throttle valve opening TVO corresponding to the engine output where the vehicle body speed Vsp is a parameter.
Figure 9:
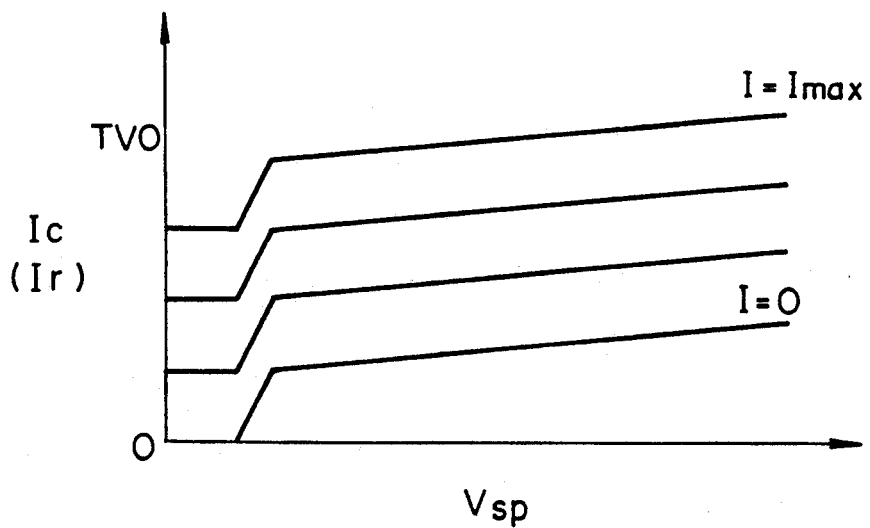
FIG. 9 indicates a map showing a relationship between the throttle valve opening TVO corresponding to the engine output and the vehicle body speed Vsp where the center differential electric current Ic (or the rear differential electric current Ir) is a parameter.

FIG. 6 is a flow chart for determining an amount of the center differential electric current Ic in auto mode control operation. FIG. 7 is a flow chart for determining an amount of the rear differential electric current Ir in auto mode control operation. FIG. 8 indicates a map showing a relationship between the center differential electric current Ic (or the rear differential electric current Ir) and the throttle valve opening TVO corresponding to the engine output where the vehicle body speed Vsp is a parameter. FIG. 9 is a map showing a relationship between the throttle valve opening TVO corresponding to the engine output and the vehicle body speed Vsp where the center differential electric current Ic (or the rear differential electric current Ir) is a parameter.

Referring to FIG. 6, first, the center differential electric current Ica is obtained based on the throttle valve opening TVO and the vehicle body speed Vsp shown in FIGS. 8 and 9, and then Ica is set as Ic (P40). Next, it is determined whether or not the center differential electric current Ic is a maximum value Imax (P41). Where the center differential electric current Ic is not the maximum value Imax, that is, Ic is less than Imax, Ic is set as Ic (P42). At this time, the center differential 20 is operated to be in half locking condition or unlocking condition. Where the center differential electric current Ic is the maximum value Imax, a timer is set at an initial value (P43), and the center differential electric current Ic is set as Imax (P44). At this time, the center differential 20 is operated to be in complete locking condition. Next, the timer is counted up (P45, P46).

Referring to FIG. 7, first, the rear differential electric current Ira is obtained based on the throttle opening TVO and the vehicle body speed Vsp shown in FIGS. 8 and 9 and then Ira is set as Ic (P50). Next, it is determined whether or not the center differential electric current Ic is a maximum value Imax (P51). Where the center differential electric current Ic is not the maximum value Imax, that is, Ic is less than Imax, Ic is set as Ic (P52). At this time, the center differential 20 is operated to be in half locking condition or unlocking condition. Where the center differential electric current Ic is the maximum value Imax, a timer is set at an initial value (P53), and the center differential electric current Ic is set as Imax (P54). At this time, the center differential 20 is operated to be in complete locking condition. Next, the timer is counted up (P55, P56).

As shown in FIG. 8, the center differential electric current Ic (or the rear differential electric current Ir) is zero where the throttle valve opening TVO is zero, and Ic (or Ir) increases up to the maximun value Imax in proportion to the increase of TVO while the vehicle body speed Vsp is 0~10 km/h. As a result, when the vehicle is stopped and started, the restricting force applied to the differential is increased according to the increase in the engine output. Therefore, the electric power comsumption can be decreased when the vehicle is stopped, and the slips of the wheels can be prevented when the vehicle is started on the low $\mu$ road. On the other hand, when the vehicle is traveling at 50 km/h, Ic (or Ir) is set as zero where TVO is less than a predetermined value $0_1$ and then Ic (or Ir) increases up to the maximum value Imax in proportion to the increase in TVO. And when the vehicle is traveling at 100 km/h, Ic (or Ir) is set as zero where TVO is less than a predetermined value $0_2$ and then Ic (or Ir) increases up to the maximun value Imax in proportion to the increase in TVO.

According to the first embodiment of the present invention, since the restricting force to the differential is not applied where the engine output is less than a predetermined value, the traveling friction is decreased and therefore the electric power comsumption can be decreased.

In the first embodiment of the present invention, the center differential electric current Ic (or the rear differential electric current Ir) may be obtained based on the combination of the function of TVO and Vsp and the function of $\Delta Nc$ (or $\Delta Nr$). Here, the function of TVO and Vsp is obtained by using FIGS. 8 and 9, and the function of $\Delta Nc$ (or $\Delta Nr$) is obtained by using FIGS. 13 and 16 explained hereinater.

Next, a second embodiment of the present invention will be described hereinbelow with reference to FIGS. 10 through 16.

Figure 10:
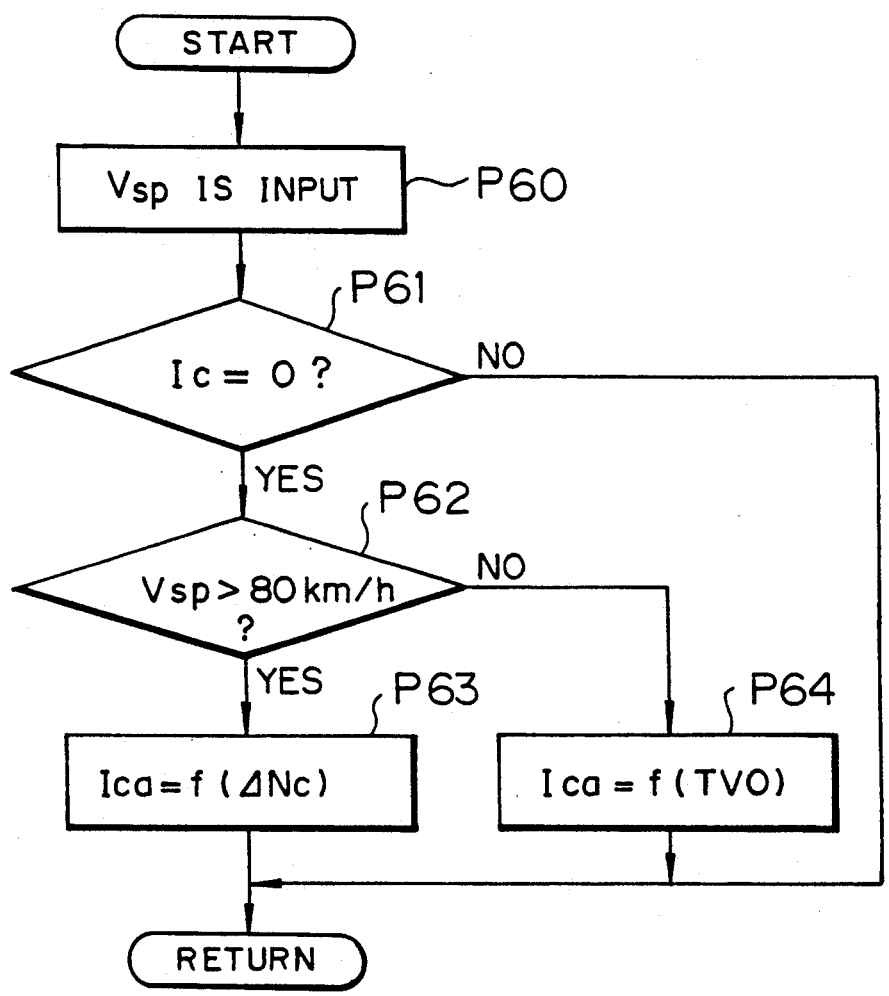
FIGS. 10 and 11 are flow charts for determining an amount of the electric current supplied to the center differential in auto mode control operation according to a second embodiment of the present invention.
Figure 11:
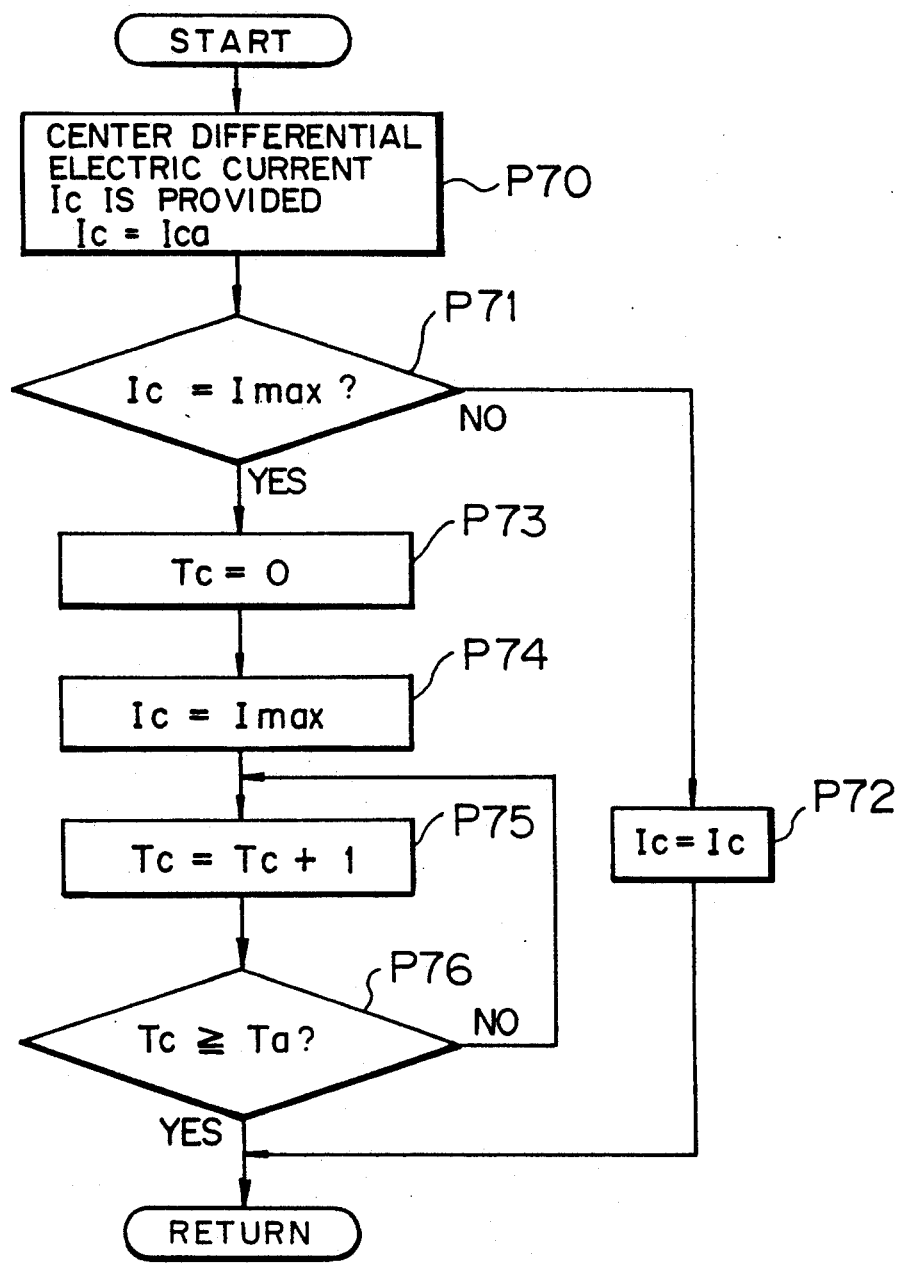

FIGS. 10 and 11 are flow charts for determining amount of the electric current supplied to the center differential in the auto mode control operation.

As shown in FIG. 10, the abovementiond vehicle body speed Vsp is input (P60), and then it is determined whether or not the center differential electric current Ic is supplied, that is, Ic is zero (P61). Where Ic is zero, that is, the center differential 20 is in unlocking condition, it is determined whether or not the vehicle body speed Vsp is greater than a predetermined value such as 80 km/h (P62 When the vehicle body speed Vsp is greater than 80 km/h, that is, the vehicle is moving at a relatively high speed, the center differential electric current Ica can be obtained based on the differential rotating speed in the center differential $\Delta Nc$ by using a graphical representation showing a relationship between Ica and $\Delta Nc$ in FIG. 13 described below (P63). On the other hand, when the vehicle body speed Vsp is equal to or less than 80 km/h, that is, the vehicle is moving at a relatively low speed, the center differential electric current Ica can be obtained based on the throttle valve opening TVO by using a graphical representation showing a relationship between Ica and TVO in FIG. 12 described below (P64). When it is determined that Ic is not zero in P61, since the center differential 20 is in complete locking condition or in half locking condition, the present amount of Ic is maintained so as to prevent Ica from being reset based on the different condition. Then, when the center differential 20 changes to be in unlocking condition, the vehicle body speed Vsp is determined in P62.

Figure 12:
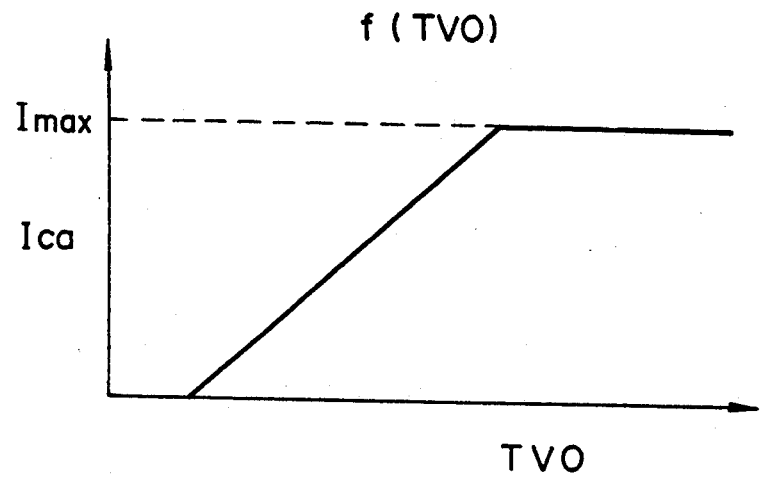
FIG. 12 is a graphical representation showing a relationship between the center differential electric current Ica and the throttle opening TVO.
Figure 13:
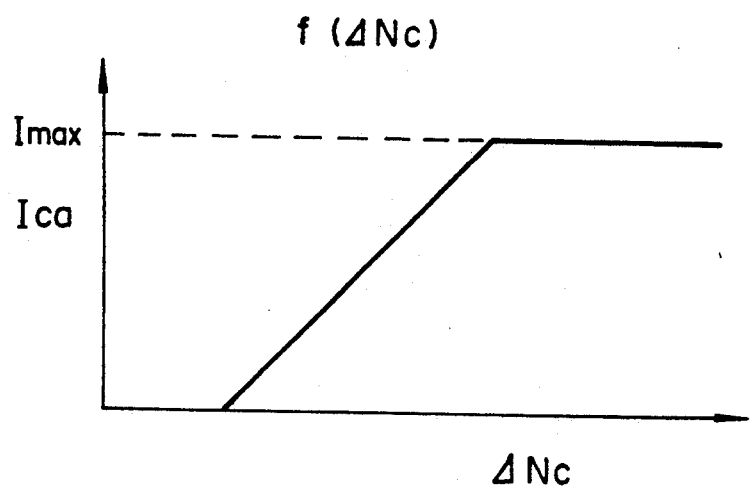
FIG. 13 is a graphical representation showing a relationship between the center differential electric current Ica and the differential rotating speed in the center differential $\Delta Nc$.

FIG. 12 is a graphical representation showing a relationship between the center differential electric current Ica and the throttle opening TVO. FIG. 13 is a graphical representation showing a relationship between the center differential electric current Ica and the differential rotating speed in the center differential $\Delta Nc$. As shown in FIGS. 8 and 9, the more TVO or $\Delta Nc$ increases, the more Ica increases, and Ica is set at a maximum value Imax where TVO or $\Delta Nc$ goes over a predetermined value thereof.

Referring to FIG. 11, the center differential electric current Ic is provided as Ica obtained by graphical representations in FIGS. 12 and 13 (P70). Next, it is determined whether or not the center differential electric current Ic is a maximum value Imax (P71). Where the center differential electric current Ic is not the maximum value Imax, that is, Ic is less than Imax, Ic is set as Ic (P72). At this time, the center differential 20 is operated to be in half locking condition or unlocking condition. Where the center differential electric current Ic is the maximum value Imax, a timer is set at an initial value (P73), and the center differential electric current Ic is set as Imax (P74). At this time, the center differential 20 is in complete locking condition. Next, the timer is counted up (P75), and then it is determined whether or not a predetermined time period Ta has been passed (P76). Thus, since the complete locking condition in the center differential 20 is maintained in the predetermined time period Ta, the hunting caused by rapid changes in the differential rotating speed in the center differential $\Delta Nc$ or the throttle valve opening TVO can be prevented.

A control operation for determining an amount of the electric current Ir supplied to the rear differential 22 in auto mode control operation can be carried out in a manner similar to the manner of the center differential 20 shown in FIGS. 10 through 13. That is, the rear differential electric current Ira can be obtained based on the differential rotating speed in the rear differential $\Delta Nr$ when the vehicle is traveling at the reratively high speed greater than a predetermined value, and can be obtained based on the throttle valve opening TVO when the vehicle is traveling at the relatively low speed equal to or less than the predetermined value. It should be noted that the center differential electric current Ic, Ica and the differential rotating speed in the center differential $\Delta Nc$ shown in FIGS. 10 through 13 must be replaced respectively by the rear differential electric current Ir, Ira and the differential rotating speed in the rear differential $\Delta Nr$.

In the second embodiment of the present invention, the center differential electric current Ic and the rear differential electric current Ir in auto mode control operation differ based on whether the vehicle body speed Vsp is greater than the predetermined value or not. That is, the center differential electric current Ica and the rear differential electric current Ira can be obtained based on the differential rotating speeds $\Delta Nc$, $\Delta Nr$ when the vehicle is traveling at the relatively high speed greater than the predetermined value, and can be obtained based on the throttle opening TVO when the vehicle is traveling at relatively low speed equal to or less than the predetermed value.

As a result, when the vehicle is traveling at the relatively high speed where it is relatively hard for slip to occur, and only when the slip has occured actually, the center differential electric current Ica and the rear differential electric current Ira are controlled so as to be increased so that the slip which has actually occured is decreased. Therefore, fuel consumption efficiency can be improved in such control operation. On the other hand, when the vehicle is traveling at the reratively low speed where the slip occurs relatively easily, the center differential electric current Ica and the rear differential electric current Ira are controlled so as to be increased so that the slip is prevented from occurring beforehand. Therefore, the acceleration ability corresponding to the engine output can be improved by a such control operation.

Figure 14:
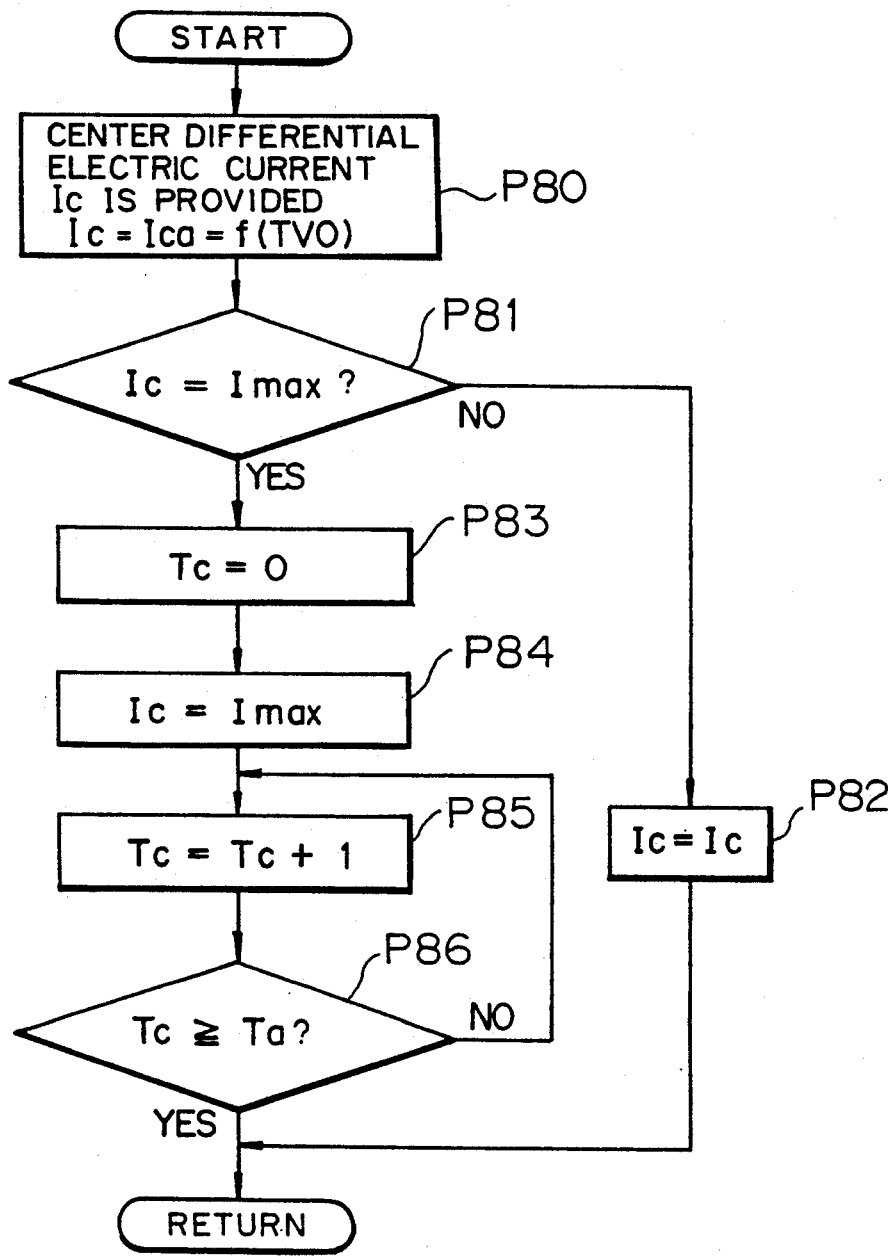
FIGS. 14 and 15 are flow charts showing another example of the second embodiment of the present invention.
Figure 15:
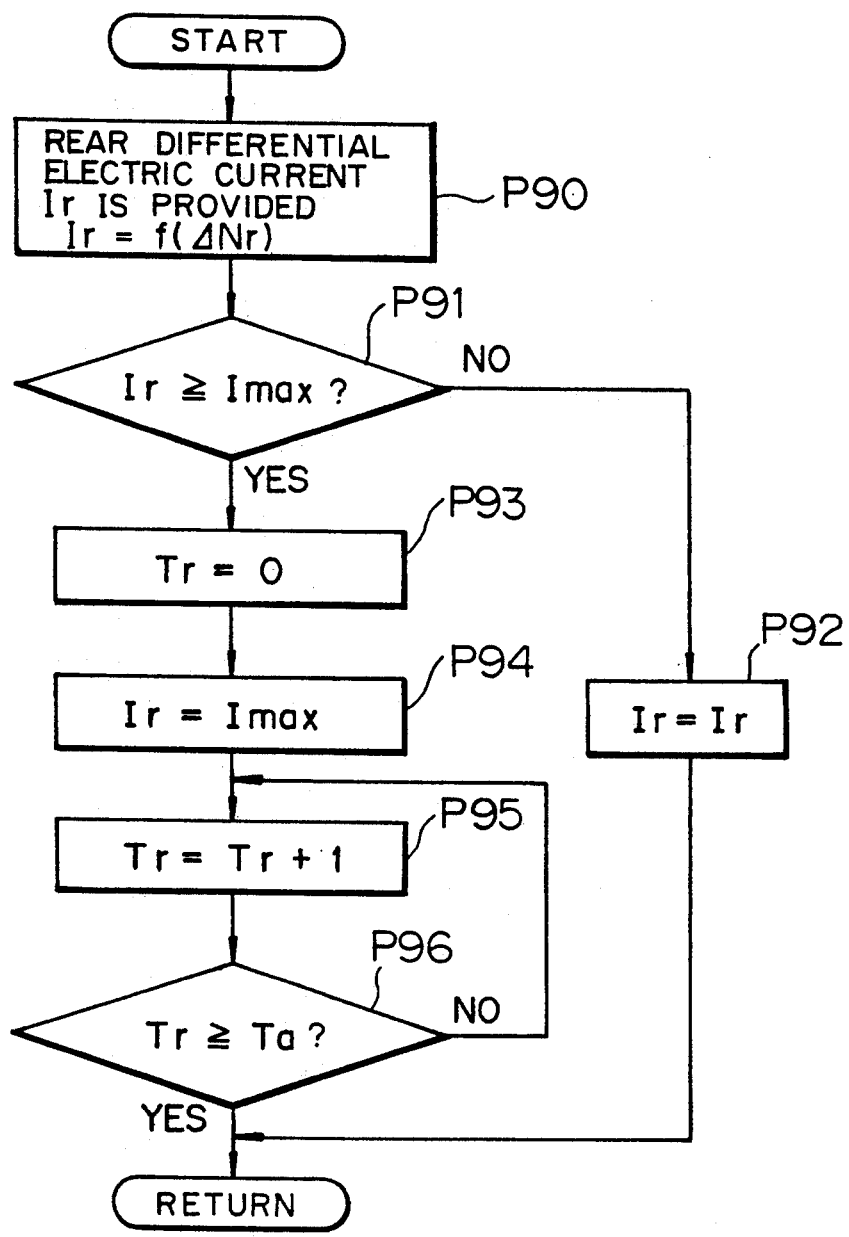
Figure 16:
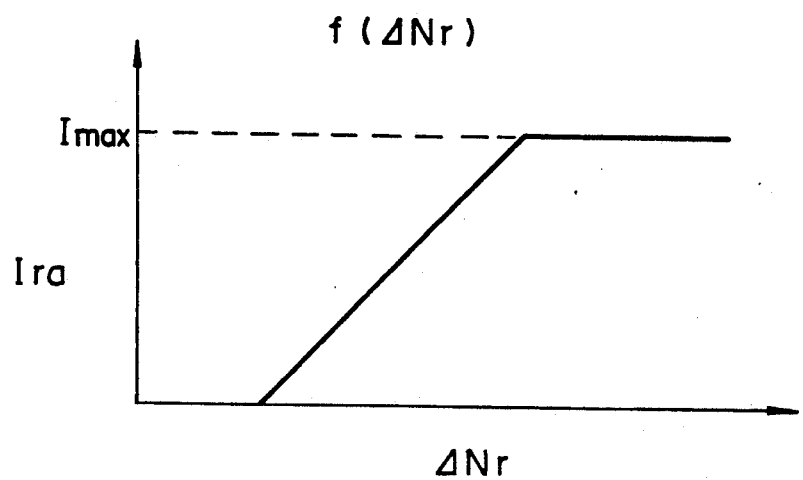
FIG. 16 is a graphical representation showing a relationship between the rear differential electric current Ica and the differential rotating speed in the rear differential $\Delta Nr$.

FIGS. 14 and 15 are flow charts showing another example of the second embodiment of the present invention. FIG. 16 is a graphical representation showing a relationship between the rear differential electric current Ica and the differential rotating speed in the rear differential $\Delta Nr$.

In another example of the second embodiment, the center differential electric current Ica of the center differential 20, which is disposed on the upstream portion of the power train, namely disposed near the engine, is obtained based on the throttle valve opening TVO. On the other hand, the rear differential electric current Ira of the rear differential 20, which is disposed on the downstream portion of the power train, namely disposed near the wheels, is obtained based on the differential rotating speed in the rear differential $\Delta Nr$.

FIG. 14 is a flow chart for determining the amount of the center differential electric current Ic in auto mode control operation. First, the center differential electric current Ica is obtained based on the throttle valve opening TVO shown in FIG. 12 and then Ica is set as Ic (P80). Next, it is determined whether or not the center differential electric current Ic is a maximum value Imax (P81). Where the center differential electric current Ic is not the maximum value Imax, that is, Ic is less than Imax, Ic is set as Ic (P82). At this time, the center differential 20 is operated to be in half locking condition or unlocking condition. Where the center differential electric current Ic is the maximum value Imax, a timer is set at an initial value (P83), and the center differential electric current Ic is set as Imax (P84). At this time, the center differential 20 is operated to be in complete locking condition. Next, the timer is counted up (P85, P86).

FIG. 15 is a flow chart for determining the amount of the rear differential electric current Ir in the auto mode control operation. First, the rear differential electric current Ira is obtained based on the differential rotating speed in the rear differential $\Delta Nr$ shown in FIG. 16 and then Ira is set as Ir (P90). Next, it is determined whether or not the rear differential electric current Ir is a maximum value Imax (P91). Where the center differential electric current Ic is not the maximum value Imax, that is, Ic is less than Imax, Ic is set as Ic (P92). At this time, the rear differential 22 is operated to be in half locking condition or unlocking condition. Where the rear differential electric current Ir is the maximum value Imax, a timer is set at an initial value (P93), and the center differential electric current Ic is set as Imax (P94). At this time, the rear differential 22 is operated to be in complete locking condition. Next, the timer is counted up (P95, P96).

In the abovementioned another example of the second embodiment, the center differential electric current Ica of the center differential 20 is obtained based on the throttle opening TVO and, on the other hand, the rear differential electric current Ira of the rear differential 22 is obtained based on the differential rotating speed in the rear differential $\Delta Nr$. Therefore, since the center differential 20 which is disposed near the engine and distributes the driving power (torque) to the front wheels 16 and the rear wheels 18 restricts the differential based on the engine output, the driving power can be definitely distributed to the front wheels 16 and the rear wheels 18. On the other hand, since the rear differential 22 which is disposed near the rear wheels and distributes the driving power (torque) to the right rear wheel and the left rear wheel restricts the differential based on the differential rotating speed between the right rear wheel and the left rear wheel, the slip in the rear wheels can be prevented without influencing the front wheels and good controllability of the vehicle can be obtained.

According to the second embodiment of the present invention, another control operation may be carried out where the center differential electric current Ic differs based on whether the vehicle body speed Vsp is greater than the predetermined value or not as shown in FIGS. 10 through 13. On the other hand, the rear differential electric current Ir is obtained, for example, based on the differential rotating speed $\Delta Nr$ regardless of the vehicle body speed Vsp as shown in FIGS. 15 and 16.

Next, a third embodiment of the present invention will be described hereinbelow with reference to FIGS. 17 through 29.

The third embodiment of the invention can be applied to a four-wheel drive vehicle which has a basic structure as shown in FIG. 1 but, however, does not have a front differential and a manual switch.

In the third embodiment, a vehicle body speed Vsp, a differential rotating speed in the center differential $\Delta Nc$, and a differential rotating speed in the rear differential ΔNr can be obtained respectively by using the flow charts shown in FIGS. 3 through 5.

Figure 17:
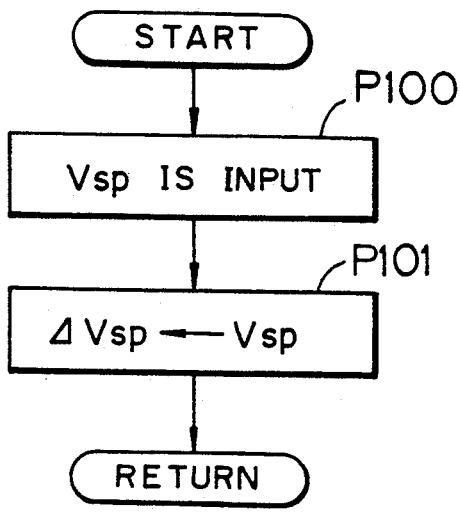
FIG. 17 is a flow chart for obtaining an acceleration of the vehicle.

FIG. 17 is a flow chart for obtaining an acceleration of the vehicle. The vehicle body speed Vsp is input (P100). Next, an acceleration of the vehicle ΔVsp is calculated (P101).

Figure 18:
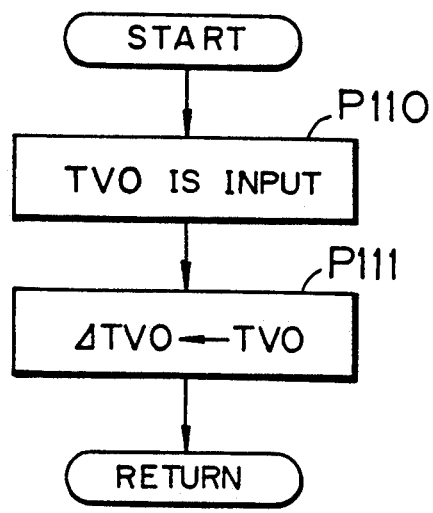
FIG. 18 is a flow chart for obtaining a rate of change in a throttle valve opening.

FIG. 18 is a flow chart for obtaining a rate of change in a throttle valve opening. The throttle valve opening TVO is input (P110). Next, a rate of change in the throttle valve opening ΔTVO is calculated (P111).

FIGS. 19 through 24 are MAP 1 through MAP 6 respectively which are employed when control operation for restricting differentials in the center differential and the rear differential are carried out. These MAP 1 through MAP 6 are provided with a normal traveling region (A), a hard traveling region (B) where an acceleration pedal is operated so as to be able to travel on a rough road, and a slip traveling region (C) where an actual slip is likely to occur. These regions (A), (B) and (C) were determined by a statistical analysis based on experiments using actual vehicles.

Figure 19:
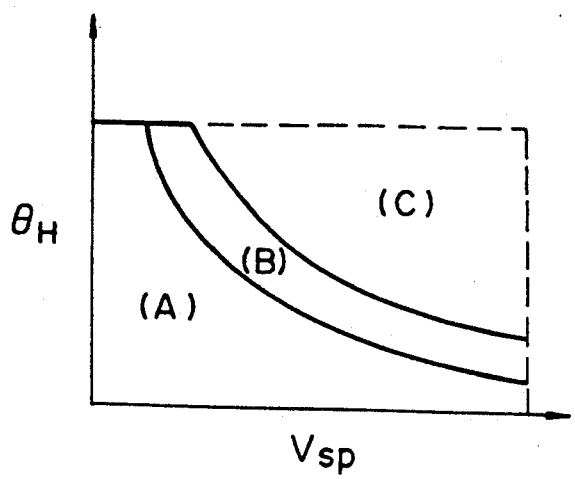
FIGS. 19 through 24 are MAP 1 through MAP 6 respectively which are employed when control operations for restricting differentials in the center differential and the rear differential are carried out.

FIG. 19 represents MAP 1 showing a relationship between the normal traveling region (A), the hard traveling region (B), the slip traveling region (C), the steering angle $\theta_H$, and the vehicle body speed Vsp. In MAP 1, the regions (A), (B) and (C) are provided so that the region (C) is located where the vehicle body speed Vsp is high and the steering angle $\theta_H$ is small.

Figure 20:
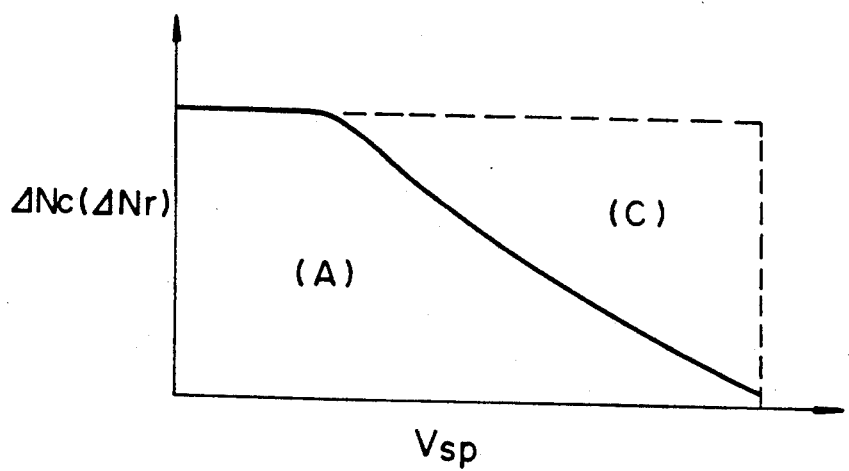

FIG. 20 represents MAP 2 showing a relationship between the normal traveling region (A), the slip traveling region (C), the differential rotating speed in the center differential ΔNc (or the differential rotating speed in the rear differential ΔNr), and the vehicle body speed Vsp. In MAP 2, the regions (A) and (C) are provided so that the region (C) is located where the vehicle body speed Vsp is high and the differential rotating speed in the center differential ΔNc is low, since it can be assumed that, while the center differential rotating speed in the center differential ΔNc is high, the vehicle is turning when it is traveling at a low vehicle body speed Vsp and the vehicle actually slippes when it is traveling at a high vehicle body speed Vsp.

Figure 21:
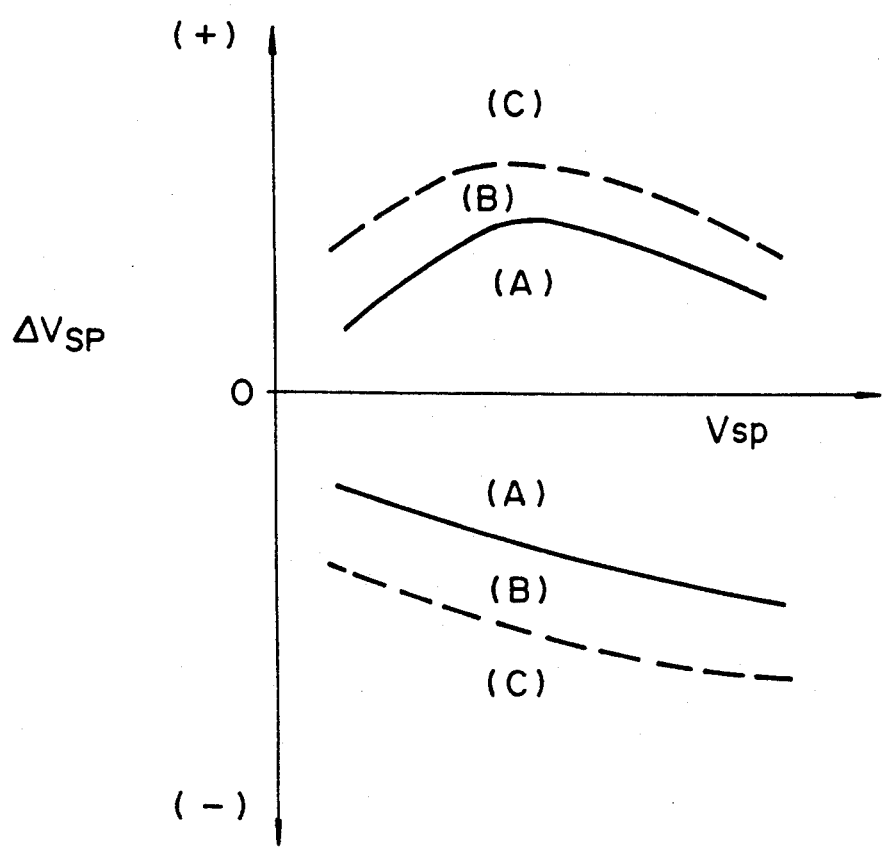

FIG. 21 represents MAP 3 showing a relationship between the normal traveling region (A), the hard traveling region (B), the slip traveling region (C), the acceleration of the vehicle ΔVsp, and the vehicle body speed Vsp. Since, in MAP 3, it can be assumed that the slip has occurred at a low speed Vsp and a large acceleration of the vehicle ΔVsp, it is hard for slip to occur at an intermediate speed Vsp, and a hard driving operation is carried out at a high speed Vsp and a large acceleration of the vehicle ΔVsp. Therefore, in MAP 3, the regions (A), (B) and (C) are provided so that the slip traveling region (C) is located where the vehicle is traveling at a low or high speed Vsp with a relatively small acceleration ΔVsp. Where the acceleration of the vehicle ΔVsp is negative, it can be assumed that the lower the speed Vsp is, the easier it is for the wheels to be locked by a raid braking operation. Therefore, the regions (A), (B) and (C) are provided so that the slip traveling region (C) is located where the vehicle is traveling at a low speed Vsp with a small negative acceleration ΔVsp. According to the second embodiment of the invention, an acceleration of the driving wheels, a rate of change in the engine rotating speed, or a rate of change in torque applied to the wheels obtained by R/L lines and gear stages may be employed instead of the acceleration of the vehicle ΔVsp in MAP 3.

Figure 22:
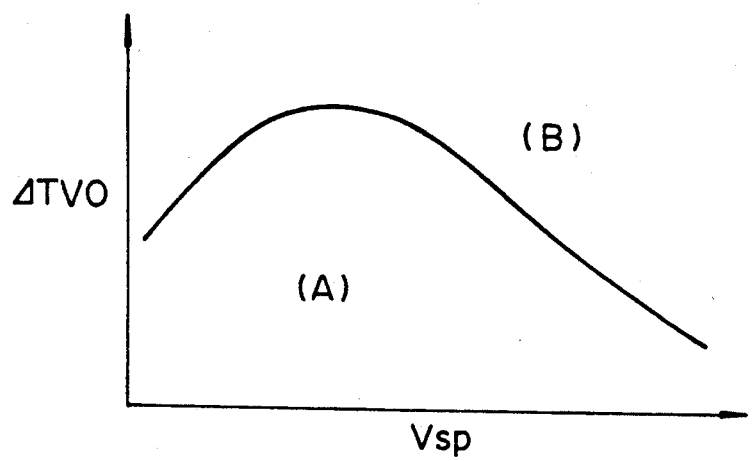

FIG. 22 represents MAP 4 showing a relationship between the normal traveling region (A), the hard traveling region (B), the rate of change in the throttle valve opening ΔTVO, and the vehicle body speed Vsp. In MAP 4, the regions (A), (B) are provided so that the hard traveling region (B) is located where the vehicle is traveling at a low or high speed Vsp with a small rate of change in the throttle valve opening ΔTVO.

Figure 23:
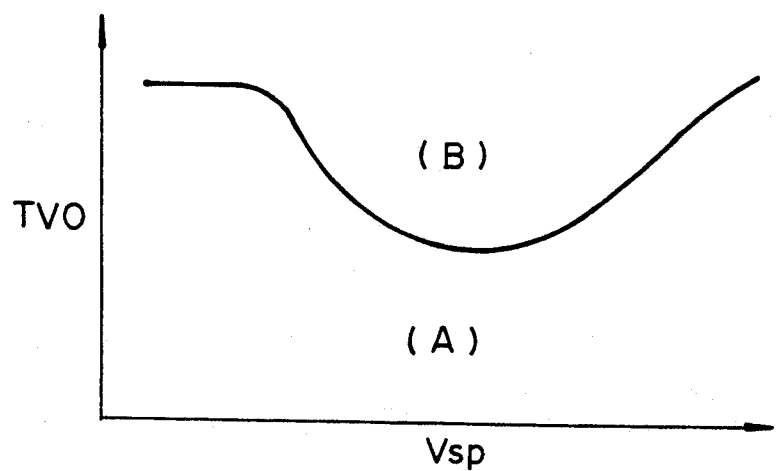

FIG. 23 represents MAP 5 showing a relationship between the normal traveling region (A), the hard traveling region (B), the throttle valve opening TVO, and the vehicle body speed Vsp. In MAP 5, the regions (A), (B) are provided so that the hard traveling region (B) is located where the vehicle is traveling At an intermediate speed Vsp with small throttle valve opening TVO.

Figure 24:
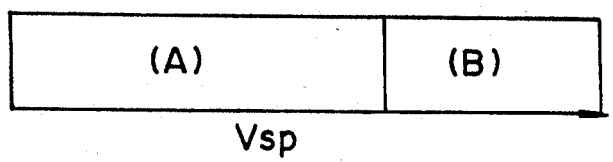

FIG. 24 represents MAP 6 showing a relationship between the normal traveling region (A), the hard traveling region (B), and the vehicle body speed Vsp. In MAP 6, the regions (A), (B) are provided so that the hard traveling region (B) is located where the vehicle is traveling at a high speed Vsp.

Figure 25:
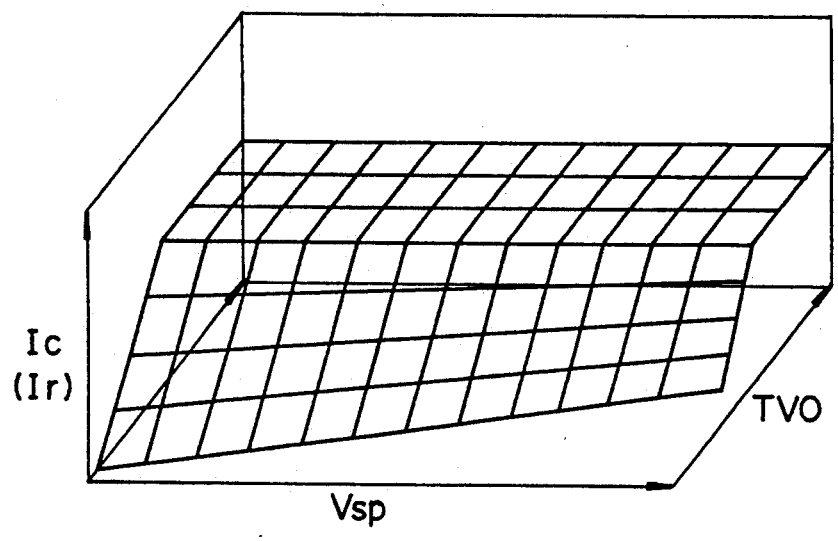
FIG. 25 represents a BASIC MAP showing a relationship between the center differential electric current Ic (or the rear differential electric current Ir), the vehicle body speed Vsp and the throttle valve opening TVO.

FIG. 25 represents BASIC MAP showing a relationship between the center differential electric current Ic (or the rear differential electric current Ir), the vehicle body speed Vsp and the throttle valve opening TVO.

Figure 26:
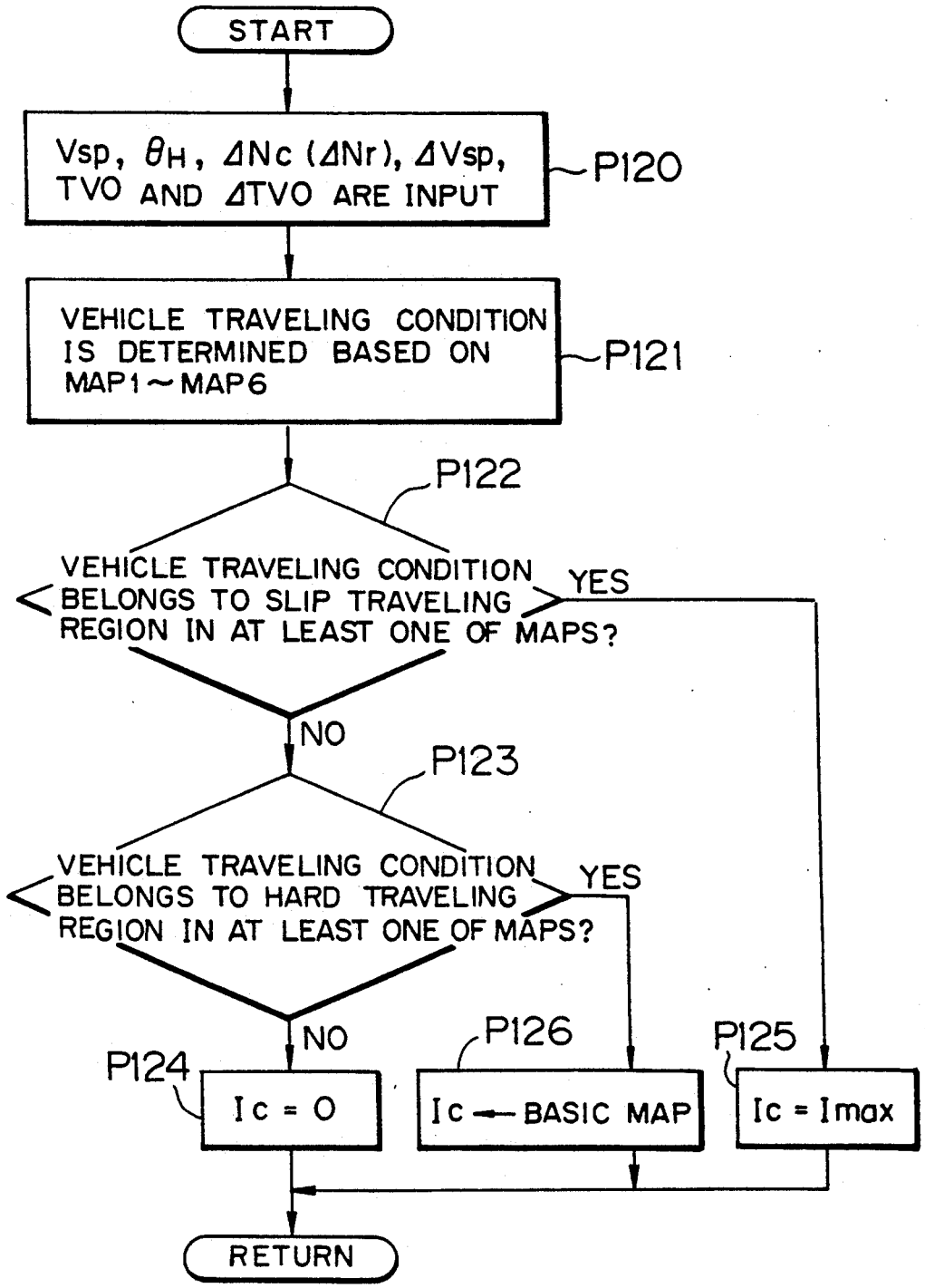
FIG. 26 is a flow chart for determining an amount of the electric current supplied to the center differential (or an amount of the electric current supplied to the rear differential) according to a third embodiment of the present invention.

FIG. 26 is a flow chart for determining the amount of the electric current supplied to the center differential (or the amount of the electric current supplied to the rear differential). The center differential electric current Ic (or the rear differential electric current Ir) can be obtained by employing the abovementioned MAP 1 through MAP 6 and BASIC MAP.

First, the vehicle body speed Vsp, the steering angle $\theta_H$ the center differential rotating speed in the center differential ΔNc (or the rear differential rotating speed in the rear differential ΔNr), the acceleration of the vehicle ΔVsp, the throttle valve opening TVO, and the rate of change in the throttle valve opening ΔTVO are input (P120). Next, which one of the regions (A), (B) and (C) in respective MAP 1 through MAP 6 the vehicle traveling condition belongs to is determined (P121). Where it is determined that the vehicle traveling condition does not belong to the slip traveling region (C) in any MAP (P122), and further it is determined that the vehicle traveling condition does not belong to the hard traveling region (B) in any MAP (P123), it is noted that the vehicle traveling condition belongs to the normal traveling region (A), and the center differential electric current Ic is set as zero (P124). Here, the center differential 20 is operated to be in unlocking condition.

Where it is determined that the vehicle traveling condition belongs to the slip traveling region (C) in at least one of MAP 1 through MAP 6 (P122), the center differential electric current Ic is set as Imax so that the center differential 20 is operated to be in complete locking condition (P125). Where it is determined that the vehicle traveling condition belongs to the hard traveling region B) in at least one of MAP 1 through MAP 6 (P123), the center differential electric current Ic is set based on BASIC MAP so that the center differential 20 is operated to be in half locking condition (P126).

The rear differential electric current Ir in the rear differential 22 may be obtained by using the same manner as that used to determine the center differential electric current Ic.

According to the third embodiment of the present invention, the center differential 20 and the rear differential 22 are operated to be in half locking condition where the vehicle traveling condition is determined to belong to the hard traveling region (B). As a result, the amounts of the center differential electric current Ic and the rear differential electric current Ir supplied to the electro-magnetic multiplate clutches 50 provided in the center differential 20 and the rear differential 22 become small values, and the electric power comsumption can be decreased. Further, stability of the vehicle can be obtained since the center differential 20 is operated to be in half locking condition.

Other examples of the third embodiment of the present invention will be described hereinbelow.

Figure 27:
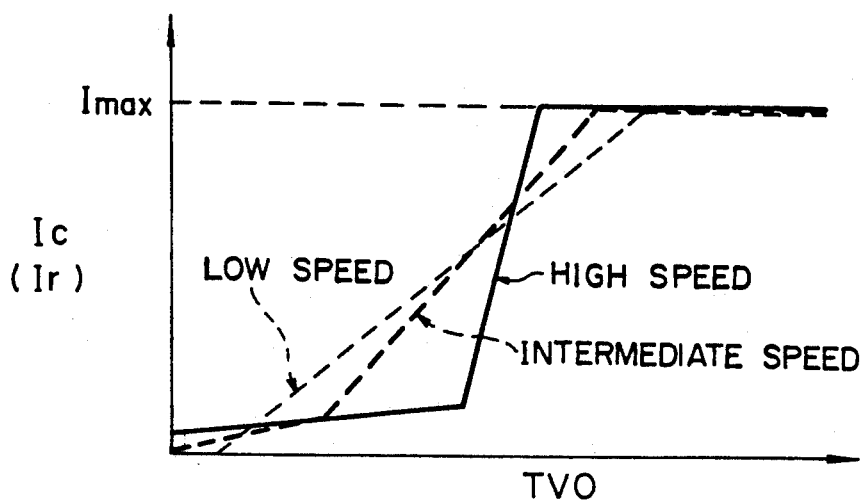
FIG. 27 is a map showing a relationship between the center differential electric current Ic (or the rear differential electric current Ir), the throttle valve opening TVO corresponding to the engine output, and the vehicle body speeds (low speed, intermediate speed and high speed) according to another example of the third embodiment of the present invention.

Referring to FIG. 27, another example of the second embodiment will be explained. FIG. 27 is a map showing a relationship between the center differential electric current Ic (or the rear differential electric current Ir), the throttle valve opening TVO corresponding to the engine output, and the vehicle body speeds including low speed, intermediate speed and high speed. In another example of the third embodiment, the center differential electric current Ic (or Ir) which corresponds to the restricting force to the differential in the center differential 20 (or the rear differential 22) is operated to be increased slowly at small throttle valve opening TVO when the vehicle is traveling at a low speed, and is operated to be increased rapidly at large throttle valve opening TVO when the vehicle is traveling at a high speed. The center differential electric current Ic (or Ir) is set as a maximum value Imax when the throttle valve opening TVO is equal to or greater than a predetermined value.

According to the another example of the third embodiment, since the slip is likely to occur at a low speed even where the engine output is small, the center differential electric current Ic (or Ir) is operated to be increased slowly at small throttle valve opening TVO. Therefore, when the vehicle is traveling at a low speed, the electric power comsumption can be decreased, and the stability of the vehicle can be obtained. On the other hand, since the slip is likely to occur at a high speed by means of the rapid acceleration operation, the center differential electric current Ic (or Ir) is operated to be increased rapidly at a large throttle valve opening TVO. Therefore, when the vehicle is traveling at a high speed, electric power comsumption can be decreased, and stability of the vehicle can be obtained.

Figure 28:
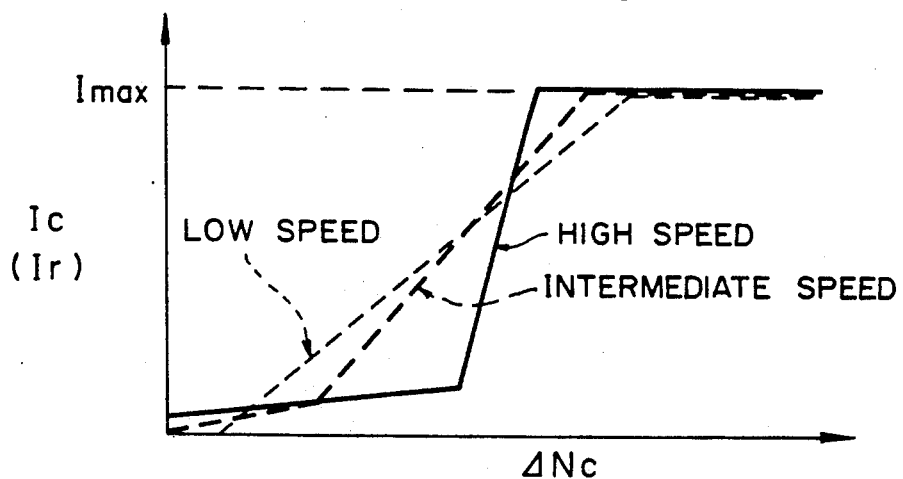
FIG. 28 is a map showing a relationship between the center differential electric current Ic, the center differential rotating speed $\Delta Nc$, and the vehicle body speeds (low speed, intermediate speed and high speed) according to another example of the third embodiment of the present invention.
Figure 29:
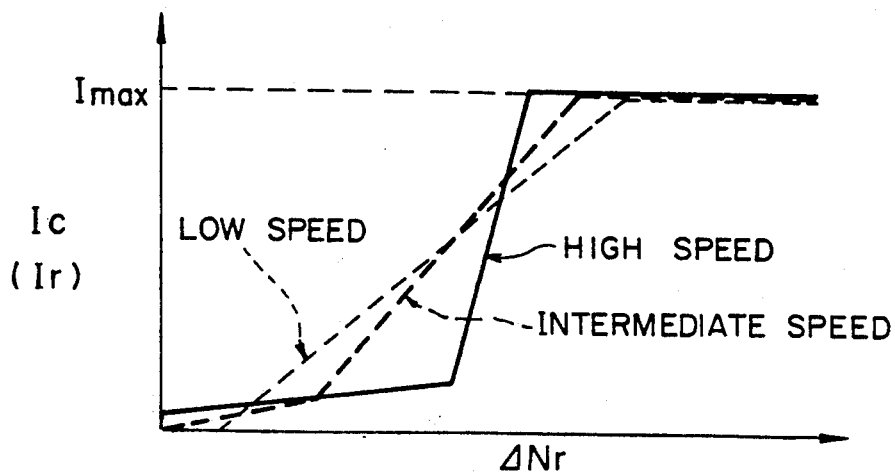
FIG. 29 is a map showing a relationship between the rear differential electric current Ir, the rear differential rotating speed $\Delta Nr$, and the vehicle body speeds (low speed, intermediate speed and high speed) according to another example of the third embodiment of the present invention.

In the third embodiment of the present invention, as shown in FIGS. 28 and 29, instead of the throttle valve opening TVO corresponding to the engine output as shown in FIG. 27, the center differential rotating speed $\Delta Nc$ and the rear differential rotating speed $\Delta Nr$ may be employed. FIG. 28 is a map showing a relationship between the center differential electric current Ic, the center differential rotating speed $\Delta Nc$, and the vehicle body speeds including low speed, intermediate speed and high speed. FIG. 29 is a map showing a relationship between the rear differential electric current Ir, the rear differential rotating speed $\Delta Nr$, and the vehicle body speeds (low speed, intermediate speed and high speed). According to the third embodiment of the invention as shown in FIGS. 28 and 29, electric power comsumption can be decreased, and stability of the vehicle can be obtained.

The present invention has been described with reference to the preferred the embodiments which are applied to a four-wheel drive vehicle. However, the present invention may be applied to a vehicle other than a four-wheel drive vehicle which includes a differential such as a rear differential and does not include a center differential.

The invention has been described with reference to the preferred embodiments thereof which are intended to be illustrative rather than limiting. Various changes and modifications may be made without departing from the spirit and scope of the invention as defined in the following claims.

What is claimed is:

1. A control system for a four-wheel drive vehicle including a center differential provided between a front shaft and a rear shaft, said system comprising:
differential restricting means for restricting a differential between the front shaft and the rear shaft by operating the center differential to be between a locking condition and an unlocking condition, and
means for controlling a restricting force of the differential restricting means based on a difference in rotation between the front shaft and the rear shaft so that the greater the difference is, the more restricted the restricting force is when vehicle body speed is greater than a predetermined value, and controlling the restricting force of the differential restricting means based on engine output so that the greater the engine output is, the more restricted the restricting force is when the vehicle body speed is equal to or less than the predetermined value.

2. A control system for a four-wheel drive vehicle in accordance with claim 1 in which the vehicle further includes a second differential provided between a right wheel and a left wheel and the control system further includes second differential restricting means for restricting a differential between the right wheel and the left wheel by operating the second differential to be between a locking condition and an unlocking condition, and second means for controlling a restricting force of the second differential restricting means based on a difference in rotation between the right wheel and the left wheel so that the greater the difference is, the more restricted the restricting force is when vehicle body speed is greater than the predetermined value, and controlling the restricting force of the second differential restricting means based on the engine output so that the greater the engine output is, the more restricted the restricting force is when the vehicle body speed is equal to or less than the predetermined value.

3. A control system for a four-wheel drive vehicle including a first differential provided between a front shaft and a rear shaft and a second differential provided between a right wheel and a left wheel, said system comprising:
first restricting means provided in the first differential for restricting a differential between the front shaft and the rear shaft;
second restricting means provided in the second differential for restricting a differential between the right wheel and the left wheel; and
controlling means for controlling the first restricting means and the second restricting means, said controlling means controlling a restricting force of the first restricting means based on an engine output so that the greater the engine output is, the more restricted the restricting force of the first restricting means is and controlling a restricting force of the second restricting means based on a difference in rotation between the right wheel and the left wheel so that the greater the difference is, the more restricted the restricting force of the second restriction means is.

4. A control system in accordance with claim 3 in which said second differential is a rear differential provided between a right rear wheel and a left rear wheel.

5. A control system for a four-wheel drive vehicle including a center differential provided between a front shaft and a rear shaft, said system comprising:
    differential restricting means for restricting a differential between the front shaft and the rear shaft by operating the center differential to be between a locking condition and an unlocking condition;
    traveling condition determining means for determining a traveling condition of the vehicle, said traveling condition determining means including a plurality of selecting means for selecting which one of a normal traveling region, a hard traveling region and a slip traveling region is applied based on each of corresponding maps which is divided into those regions by at least one traveling parameter, and final determining means which determines the slip traveling region to be applied when at least one of the selecting means selects the slip traveling region, determines the hard traveling region to be applied when at least one of the selecting means selects the hard traveling region and none of the other selecting means selects the slip traveling region and determines the normal traveling region to be applied when all of the selecting means select the normal traveling region; and
    means for controlling a restricting force of the differential restricting means so that the center differential is in a locking condition in the slip traveling region and an unlocking condition in the normal traveling region, and controlling the restricting force of the differential restricting means to be in half-locking condition, based on the traveling parameter, in the hard traveling region.

6. A control system in accordance with claim 5 in which the differential restricting means is placed in the half-locking condition based on a vehicle body speed and an engine output.

7. A control system for a four-wheel drive vehicle including a center differential provided between a front shaft and a rear shaft, said system comprising:
    differential restricting means for restricting a differential between the front shaft and the rear shaft by operating the center differential to be between a locking condition and an unlocking condition; and
    means for controlling the differential restricting means so that the greater the engine output is, the more restricted the restricting force of the differential restricting means and the greater a vehicle body speed is, the more rapidly the restricting force of the differential restricting means increases.

8. A control system for a four-wheel drive vehicle including a center differential provided between a front shaft and a rear shaft, said system comprising:
    differential restricting means for restricting a differential between the front shaft and the rear shaft by operating the center differential to be between a locking condition and an unlocking condition; and
    means for controlling the differential restricting means based on a difference in rotation between the front shaft and the rear shaft so that the greater the difference is, the more restricted the restricting force of the differential restricting means is, and so that the greater a vehicle body speed is, the more rapidly the restricting force of the differential restricting means increases.

9. A control system for a vehicle including a differential device provided between a right wheel and a left wheel, said system comprising:
    differential restricting means for restricting a differential between the right wheel and the left wheel by operating the differential device to be between a locking condition and an unlocking condition; and
    means for controlling a restricting force of the differential restricting means based on a difference in rotation between the right wheel and the left wheel so that the greater the difference in rotation is, the more restricted the restricting force of the differential restricting means is when vehicle body speed is greater than a predetermined value, and controlling the restricting force of the differential restricting means based on an engine output so that the greater the engine output is, the more restricted the restriction force of the differential restricting means is when the vehicle body speed is equal to or less than the predetermined value.

10. A control system for a vehicle including a differential device between a right wheel and a left wheel, said system comprising:
    differential restricting means for restricting a differential between the right wheel and the left wheel by operating the differential device to be between a locking condition and an unlocking condition;
    traveling condition determining means for determing a traveling condition of the vehicle, said traveling condition determining means including a plurality of selecting means for selecting which one of a normal traveling region a hard traveling region and a slip traveling region is applied based on each of corresponding maps which is divided into those regions by at least one traveling parameter, and final determining means which determines the slip traveling region to be applied when at least one of the selecting means selects the slip traveling region, determines the hard traveling region to be applied when at least one of the selecting means selects the hard traveling region and none of the other selecting means selects the slip traveling region and determines the normal traveling region to be applied when all of the selecting means select the normal traveling region; and
    means for controlling a restricting force of the differential restricting means so that the center differential is in a locking condition in the slip traveling region and an unlocking condition in the normal traveling region, and controlling the restricting force of the differential restricting means to be in a half-locking condition, based on the traveling parameter, in the hard traveling region.

11. A control system for a vehicle including a differential device provided between a right wheel and a left wheel, said system comprising:
    differential restricting means for restricting a differential between the right wheel and the left wheel by operating the differential device to be between a locking condition and an unlocking condition; and
    means for controlling the differential restricting means so that the greater the engine output is, the more restricted the restricting force of the differential restricting means is, and so that the greater a vehicle body speed is, the more rapidly the restricting force of the differential restricting means increases.

12. A control system for a vehicle including a differential device between a right wheel and a left wheel, said system comprising:

differential restricting means for restricting a differential between the right wheel and the left wheel by operating the differential device to be between a locking condition and an unlocking condition; and means for controlling the differential restricting means based on a difference in rotation between the right wheel and the left wheel so that the greater the differential rotating number is, the more restricted the restricting force of the differential restricting means is, and so that the greater a vehicle body speed is, the more rapidly the restricting force of the differential restricting means increases.

* * * * *